United States Patent
Moustafa et al.

(10) Patent No.: US 12,014,627 B2
(45) Date of Patent: *Jun. 18, 2024

(54) TECHNOLOGIES FOR MANAGING INTEROPERABLE HIGH DEFINITION MAPS FOR AUTONOMOUS VEHICLES

(71) Applicant: Intel Corporation, Santa Clara, CA (US)

(72) Inventors: Hassnaa Moustafa, Portland, OR (US); Subramanian Anandaraj, Chandler, AZ (US); Srivathsan Soundararajan, Santa Clara, CA (US); Ana Lucia A. Pinheiro, Plano, TX (US); Jithin Sankar Sankaran Kutty, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/117,360

(22) Filed: Mar. 3, 2023

(65) Prior Publication Data
US 2023/0282102 A1    Sep. 7, 2023

Related U.S. Application Data

(63) Continuation of application No. 17/648,170, filed on Jan. 17, 2022, now Pat. No. 11,615,703, which is a
(Continued)

(51) Int. Cl.
*G05D 1/02* (2020.01)
*G01C 21/00* (2006.01)
(Continued)

(52) U.S. Cl.
CPC ....... *G08G 1/0145* (2013.01); *G01C 21/3841* (2020.08); *G01C 21/3881* (2020.08);
(Continued)

(58) Field of Classification Search
CPC ............... G08G 1/0145; G08G 1/0116; G08G 1/096725; G08G 1/09675;
(Continued)

(56) References Cited

U.S. PATENT DOCUMENTS 10,203,698 B1    2/2019  Tafti et al.
10,317,240 B1    6/2019  Pietro et al.
(Continued)

*Primary Examiner* — Rodney A Butler
(74) *Attorney, Agent, or Firm* — Alliance IP, LLC

(57) ABSTRACT

Technologies for managing interoperable high definition (HD) maps for autonomous vehicles includes a HD map server to distribute interoperable HD map tiles to various autonomous vehicles, each of which may be configured to utilize proprietary HD map tiles of different propriety formats. As such, each of the autonomous vehicles is configured to translate the interoperable HD map tile to the proprietary format used by that particular vehicle. Additionally, each autonomous vehicle may submit crowd-sourced sensor data to the interoperable HD map server using a universal data set by converting the sensor data to a universal data structure.

18 Claims, 9 Drawing Sheets

Related U.S. Application Data continuation of application No. 16/370,992, filed on Mar. 30, 2019, now Pat. No. 11,227,489.

(51) Int. Cl.
| | |
|---|---|
| *G05D 1/00* | (2006.01) |
| *G06F 16/29* | (2019.01) |
| *G08G 1/01* | (2006.01) |
| *G08G 1/09* | (2006.01) |
| *G08G 1/0967* | (2006.01) |
| *G08G 1/0968* | (2006.01) |

(52) U.S. Cl.
CPC ....... *G01C 21/3896* (2020.08); *G05D 1/0088* (2013.01); *G05D 1/0276* (2013.01); *G06F 16/29* (2019.01); *G08G 1/0116* (2013.01); *G08G 1/096725* (2013.01); *G08G 1/09675* (2013.01); *G08G 1/096791* (2013.01); *G08G 1/096827* (2013.01)

(58) Field of Classification Search
CPC ....... G08G 1/096791; G08G 1/096827; G01C 21/3841; G01C 21/3881; G01C 21/3896; G05D 1/0088; G05D 1/0276; G05D 2201/0213; G06F 16/29
See application file for complete search history.

(56) References Cited

U.S. PATENT DOCUMENTS

| | | |
|---|---|---|
| 2018/0189323 A1 | 7/2018 | Wheeler |
| 2019/0384294 A1* | 12/2019 | Shashua ............ G01C 21/3623 |
| 2020/0158519 A1 | 5/2020 | Mcgavran et al. |
| 2020/0201891 A1 | 6/2020 | Viswanathan |

* cited by examiner

TECHNOLOGIES FOR MANAGING INTEROPERABLE HIGH DEFINITION MAPS FOR AUTONOMOUS VEHICLES

CROSS-REFERENCE TO RELATED APPLICATIONS

This Application is a continuation (and claims the benefit of priority under 35 U.S.C. § 120) of U.S. patent application Ser. No. 17/648,170 filed on Jan. 17, 2022, entitled TECHNOLOGIES FOR MANAGING INTEROPERABLE HIGH DEFINITION MAPS FOR AUTONOMOUS VEHICLES, which application is a continuation of Ser. No. 16/370,992 filed Mar. 30, 2019, issued as U.S. Pat. No. 11,227,489 on Jan. 18, 2022. The disclosure of the prior Application is considered part of and is incorporated by reference in the disclosure of this Application.

BACKGROUND

An autonomous vehicle is a vehicle capable of sensing a surrounding environment and navigating through the environment to reach a predetermined destination, typically without further input from a vehicle operator. To do so, the autonomous vehicle includes various sensors, such as lasers, radar, global positioning system (GPS), and computer vision technologies, to facilitate navigation. A vehicle control system incorporated within the autonomous vehicle may process the sensor data to identify appropriate navigation paths, obstacles, relevant signage, and other navigational data. Of course, some "autonomous" vehicles may be semi-autonomous and require operator input, confirmation, and/or oversight.

High Definition (HD) maps are highly precise maps (e.g., accurate to the centimeter-level) used by autonomous vehicles to support navigation of the vehicle. HD maps differ from typical navigation maps designed for vehicle operator viewing. For example, HD maps are more precise, have multiple layers of information showing road geometry and dynamics in the road in real-time, and may not be configured for visual display. Typical HD maps relies on updates regarding the road dynamics contributed by the vehicles themselves through crowdsourcing HD maps are typically provided to an autonomous vehicle by an HD map provider, which may be incorporated into a vehicle system provided by a car manufacture, and communicated as tiles, which include navigation information for a particular area (e.g., a few kilometers square). However, many HD map providers utilize proprietary HD map solutions such that the HD maps are not interoperable across different HD map solutions and/or vehicle manufacturers. As such, autonomous vehicles cannot utilize HD map information, whether available as a tile or crowdsourced data to update existing tiles, from a non-subscribed HD map provider, which can result in a lack of HD map tiles for certain areas as different HD map providers may cover different areas. Additionally, the proprietary HD mapping solutions create difficulties in crowdsourcing HD maps, as the protocol of communicating such data, although useful and important at times, may be unknown to non-subscribed autonomous vehicles. Furthermore, the quality-of-service requirements may differ between HD map providers, which can create further difficulties in sharing HD maps and information.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
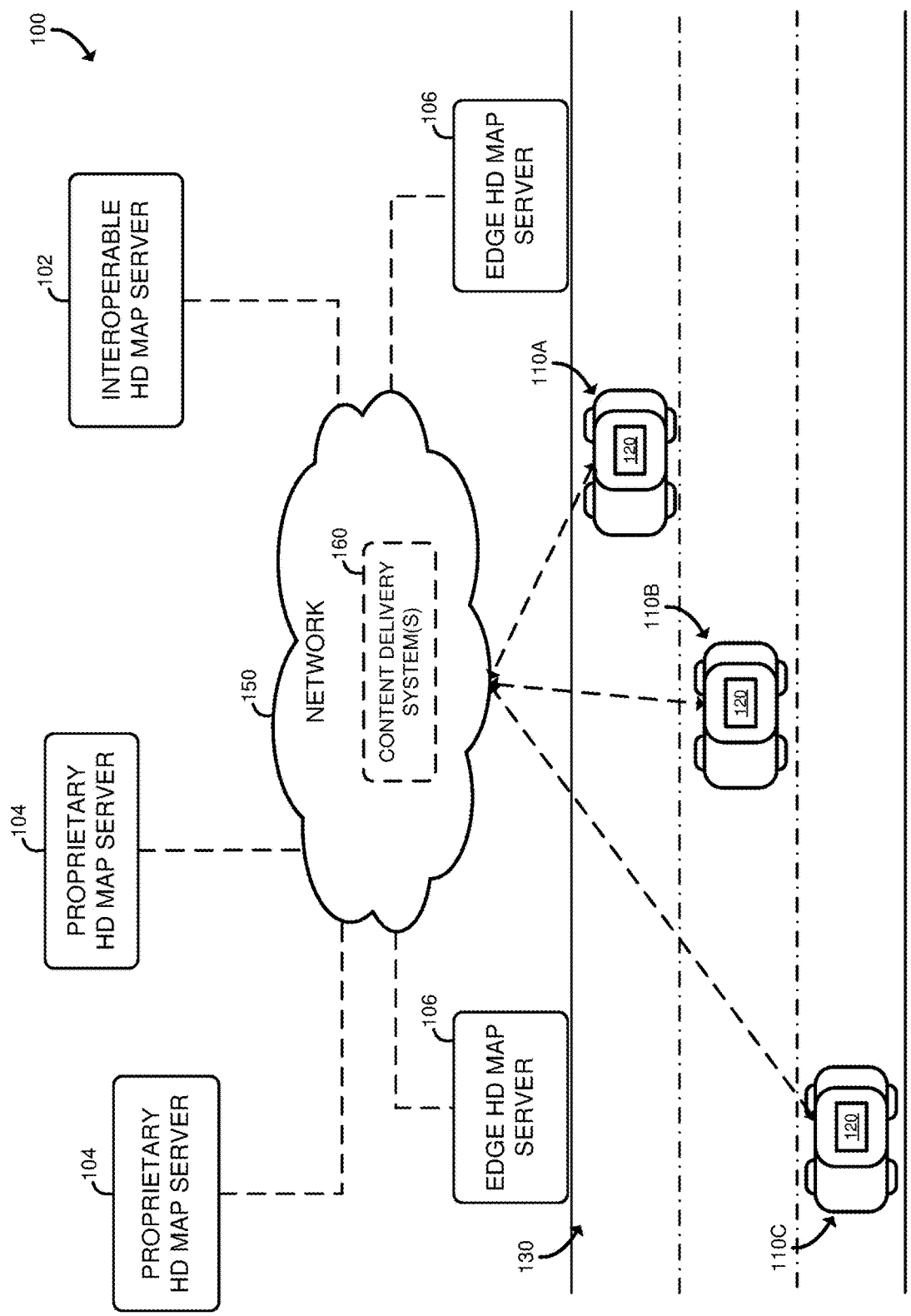
FIG. 1 is a simplified block diagram of at least one embodiment of a system for distributing HD maps to autonomous vehicles.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system for distributing high definition (HD) maps to autonomous vehicles 110 includes an interoperable HD map server 102, one or more proprietary HD map servers 104, one or more edge HD map servers 106, and one or more autonomous vehicles 110 (denoted as vehicles 110A, 110B, and 110C in FIG. 1). Each autonomous vehicle 110 may include a corresponding autonomous vehicle control system 120 to facilitate autonomous or semi-autonomous navigation of the corresponding autonomous vehicle 110 using HD tiles of the present location of the autonomous vehicle 110. However, each of the autonomous vehicles 110 (i.e., vehicles 110A, 110B, and 110C) may be configured to use HD map tiles having different proprietary formats from each other. For example, each of the vehicles 110A, 110B, and 110C may be subscribed to a different one of the proprietary HD map servers 104, which may use different proprietary formats for their corresponding HD map tiles such that each autonomous vehicle 110 is unable to utilize an HD map tile from any of the other proprietary HD map servers 104.

As such, as described in more detail below, the interoperable HD map server 102 is configured to maintain interoperable HD map tiles, which may be used by any of the autonomous vehicles 110. That is, even though each autonomous vehicle 110 may utilize its own proprietary format for its HD map tiles, each autonomous vehicle 110 can utilize the same interoperable HD map tile by translating the interoperable HD map tile to a proprietary HD map tile usable by the autonomous vehicle 110 to expand its coverage (similar to a roaming service in cellular networks in which a mobile subscriber uses the home carrier but can use foreign carriers as well in areas not covered by the home carrier). Additionally, because the interoperable HD map tiles utilize a universal format, each of the autonomous vehicles 110 may participate in crowdsourcing updates to the HD map tiles. To do so, as discussed in more detail below, the autonomous vehicle control system 120 of a participating autonomous vehicle 110 collects sensor data while traversing a roadway 130 of the location, populates a pre-defined universal data set with the collected sensor data, and transmits the populated universal data set to the interoperable HD map server 102. In do so, the autonomous vehicle control system 120 may convert the sensor data to a universal data structure to facilitate the population of the universal data set. In this way, autonomous vehicles 110 configured to use HD map tiles having different proprietary formats can still work together to update HD map tiles of a location.

As shown in FIG. 1, each of the interoperable HD map server 102, the proprietary HD map servers 104, the edge HD map servers 106, and the autonomous vehicles 110 are configured to communicate with each other over a network 150. The network 150 may be embodied as any number of various wired and/or wireless networks, or hybrids or combinations thereof. For example, the network 150 may be embodied as, or otherwise include, a mobile access network, a network edge infrastructure, a wired or wireless local area network (LAN), and/or a wired or wireless wide area network (WAN). As such, the network 150 may include any number of additional devices, such as additional base stations, access points, computers, routers, and switches, to facilitate communications among the devices of the system 100.

In the illustrative system 100, the network 150 includes one or more content delivery system 160. Each content delivery system 160 may be embodied as any number of additional servers or compute devices configured to support the transmission of data. In some embodiments, the content delivery systems 160 may store the proprietary HD map tiles and/or the interoperable HD map tiles and be under control of the servers 102, 104 to distribute the corresponding HD map tiles to the autonomous vehicles 110. In this way, content delivery systems can increase the serviceability to the autonomous vehicles 110 by lowering response times for the delivery of HD map tiles to the autonomous vehicles 110.

Figure 2:
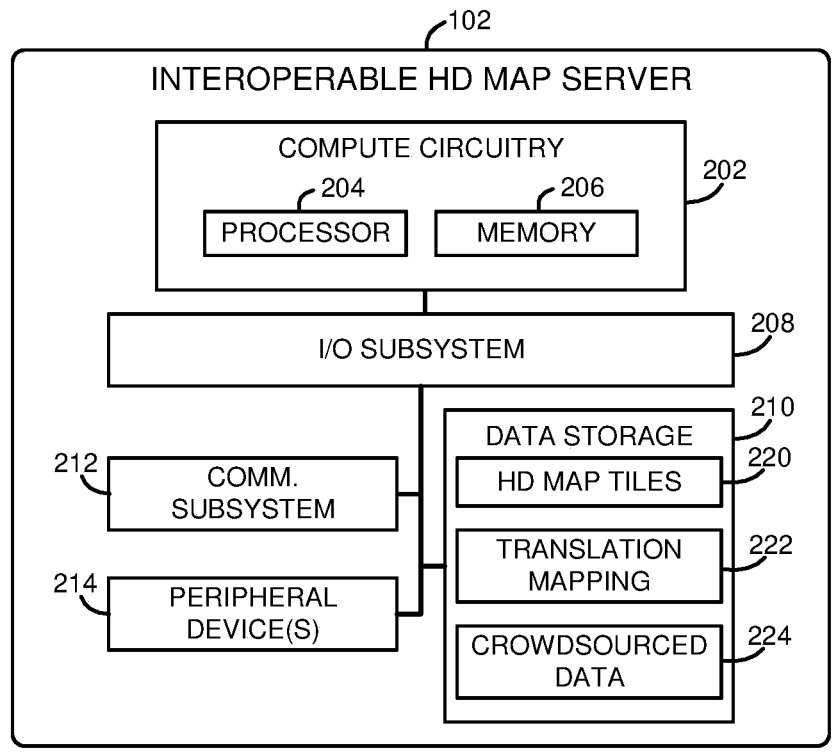
FIG. 2 is a simplified block diagram of at least one embodiment of an interoperable HD map server of the system of FIG. 1.

Referring now to FIG. 2, the interoperable HD map server 102 may be embodied as any type of server or compute device capable of maintaining and distributing interoperable HD map tiles and performing the additional functions described herein. The illustrative interoperable HD map server 102 includes compute circuitry 202, an input/output ("I/O") subsystem 208, a data storage 210, a communication subsystem 212, and, optionally, one or more peripheral devices 214. Of course, it should be appreciated that the interoperable HD map server 102 may include other or additional components, such as those commonly found in a typical compute device or server, in other embodiments. Additionally, in some embodiments, one or more of the illustrative components may be incorporated in, or otherwise form a portion of, another component.

The compute circuitry 202 may be embodied as any type of device or collection of devices capable of performing various compute functions. In some embodiments, the compute circuitry 202 may be embodied as a single device such as an integrated circuit, an embedded system, a field-programmable-array (FPGA, a system-on-a-chip (SOC), or other integrated system or device. Additionally, in some embodiments, the compute circuitry 202 includes or is embodied as a processor 204 and memory 206. The processor 204 may be embodied as any type of processor capable of performing the functions described herein. For example, the processor 204 may be embodied as a single or multi-core processor(s), digital signal processor, microcontroller, or other processor or processing/controlling circuit. Similarly, the memory 206 may be embodied as any type of volatile or non-volatile memory or data storage capable of performing the functions described herein.

The compute circuitry 202 is communicatively coupled to other components of the interoperable HD map server 102 via the I/O subsystem 208, which may be embodied as circuitry and/or components to facilitate input/output operations with compute circuitry 202 (e.g., with the processor 204 and/or memory 206) and other components of the interoperable HD map server 102. For example, the I/O subsystem 208 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 208 may be incorporated, along with the processor 204, the memory 206, and other components of the interoperable HD map server 102, into the compute circuitry 202.

The data storage 210 may be embodied as any type of device or devices configured for short-term or long-term storage of data such as, for example, memory devices and circuits, memory cards, hard disk drives, solid-state drives, or other data storage devices. As shown in FIG. 2, the data storage 210 may store interoperable HD map tiles 220, translation mapping 222, and crowdsourced data 224. As discussed above the interoperable HD map tiles 220 are HD map tiles formatted in a universal format to facilitate the use of the interoperable HD map tiles 220 by autonomous vehicles 110 configured to use diverse proprietary HD map tiles. To do so, the interoperable HD map tiles 220 may maintain the translation mappings 222, each of defines a mapping between universal aspects of the interoperable HD map tiles 220 to corresponding aspects of the proprietary HD map tiles usable by different ones of the autonomous vehicles 110. As such, the interoperable HD map server 102 may transmit an associated translation mapping 222 to an autonomous vehicle 110 along with an interoperable HD map tile to facilitate the translation of the interoperable HD map tile to a HD map tile having a proprietary format usable by the autonomous vehicle control system 120 of the requesting autonomous vehicle 110. The crowdsourced data 224 may be embodied as sensor and/or navigation data received from autonomous vehicles 110 for a particular location (e.g., a particular HD map tile). As discussed above, the crowdsourced data 224 is collected by each participating autonomous vehicle 110 while traversing a roadway 130 of the location and is formatted in a universal data structure stored in a pre-defined universal data set. Such universal formatting allows the interoperable HD map server 102 to crowdsource data from autonomous vehicles 110 configured to utilize HD map tiles of different proprietary formats.

The communication subsystem 212 may be embodied as any type of communication circuit, device, or collection thereof, capable of enabling communications between the interoperable HD map server 102 and other components of the system 100 across the network 150. To do so, the communication subsystem 212 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

Additionally, in some embodiments, the interoperable HD map server 102 may include one or more peripheral devices 214. Such peripheral devices 214 may include any type of peripheral device commonly found in a compute device or server such as audio input devices, a display, other input/output devices, interface devices, and/or other peripheral devices.

Referring back to FIG. 1, similar to the interoperable HD map server 102, each of the proprietary HD map servers 104 may be embodied as any type of server or compute device capable of maintaining and distributing proprietary HD map tiles and performing the additional functions described herein. As such, each proprietary HD map server 104 may include features and components similar to those described above in regard to the interoperable HD map server 102. For example, each proprietary HD map server 104 may include compute circuitry, an input/output ("I/O") subsystem, a data storage, a communication subsystem, and, optionally, one or more peripheral devices.

Figure 3:
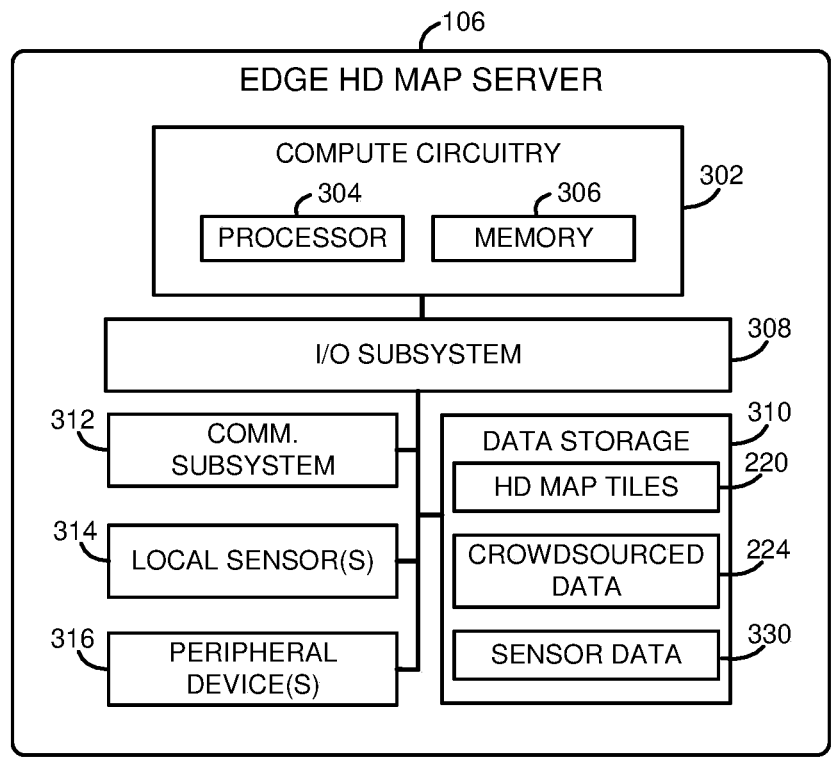
FIG. 3 is a simplified block diagram of at least one embodiment of an edge HD map server of the system of FIG. 1.

Referring now to FIG. 3, each edge HD map server 106 is configured to communicate with the autonomous vehicles 110 to collect crowdsourced data and, in some embodiments, distribute requested interoperable HD map tiles. Each edge HD map server 106 may be embodied as any type of server or compute device capable of performing the functions described herein. The illustrative edge HD map server 106 includes compute circuitry 302, an input/output ("I/O") subsystem 308, a data storage 310, a communication subsystem 312, local sensors 314, and, optionally, one or more peripheral devices 316. Of course, it should be appreciated that the edge HD map server 106 may include other or additional components, such as those commonly found in a typical compute device or server, in other embodiments. Additionally, in some embodiments, one or more of the illustrative components may be incorporated in, or otherwise form a portion of, another component.

The compute circuitry 302 may be embodied as any type of device or collection of devices capable of performing various compute functions. In some embodiments, the compute circuitry 302 may be embodied as a single device such as an integrated circuit, an embedded system, a field-programmable-array (FPGA, a system-on-a-chip (SOC), or other integrated system or device. Additionally, in some embodiments, the compute circuitry 302 includes or is embodied as a processor 304 and memory 306. The processor 304 may be embodied as any type of processor capable of performing the functions described herein. For example, the processor 304 may be embodied as a single or multi-core processor(s), digital signal processor, microcontroller, or other processor or processing/controlling circuit. Similarly, the memory 306 may be embodied as any type of volatile or non-volatile memory or data storage capable of performing the functions described herein.

The compute circuitry 302 is communicatively coupled to other components of the edge HD map server 106 via the I/O subsystem 308, which may be embodied as circuitry and/or components to facilitate input/output operations with compute circuitry 302 (e.g., with the processor 304 and/or memory 306) and other components of the interoperable HD map server 102. For example, the I/O subsystem 308 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 308 may be incorporated, along with the processor 304, the memory 306, and other components of the edge HD map server 106, into the compute circuitry 302.

The data storage 310 may be embodied as any type of device or devices configured for short-term or long-term storage of data such as, for example, memory devices and circuits, memory cards, hard disk drives, solid-state drives, or other data storage devices. As shown in FIG. 3, the data storage 310 may store the interoperable HD map tiles 220, the crowdsourced data 224, and local sensor data 330. The interoperable HD map tiles 220 may be map tiles received from the interoperable HD map server 102 and stored on the edge HD map server 106 for subsequent distribution to autonomous vehicles 110. The crowdsourced data 224 may be embodied as sensor and/or navigation data received from nearby autonomous vehicles 110, which the edge HD map server 106 may subsequently transmit to the interoperable HD map server 102. The sensor data 330 is be embodied as sensor data generated by the local sensors 314, which may be incorporated with the crowdsourced data 224 and subsequently transmitted to the interoperable HD map server 102.

The local sensors 314 may be embodied as any type of sensors capable of sensing various characteristics of surrounding area. For example, the local sensors 314 may be embodied as, or otherwise include, cameras, audio sensors, LIDAR sensors, and/or other sensors. As such, the local sensors 314 may generate any type of data that is useful to the interoperable HD map server 102 in updating interoperable HD map tiles for the surrounding area.

The communication subsystem 312 may be embodied as any type of communication circuit, device, or collection thereof, capable of enabling communications between the edge HD map server 106 and other components of the system 100 across the network 150. To do so, the communication subsystem 312 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

Additionally, in some embodiments, the edge HD map server 106 may include one or more peripheral devices 316. Such peripheral devices 316 may include any type of peripheral device commonly found in a compute device or server such as various input/output devices, interface devices, and/or other peripheral devices.

Figure 4:
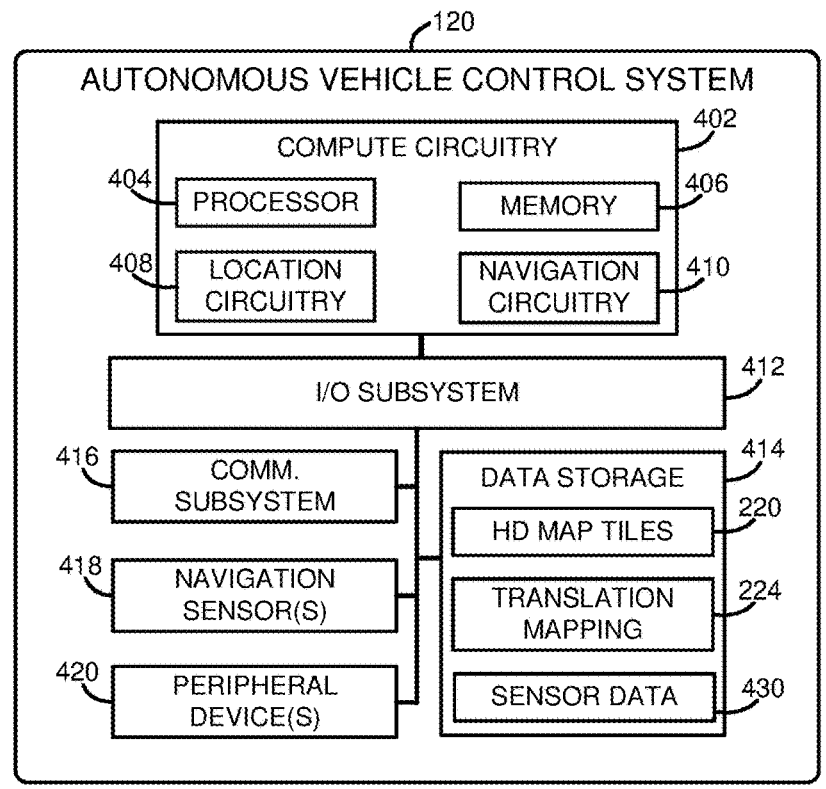
FIG. 4 is a simplified block diagram of at least one embodiment of an autonomous vehicle control system 104 of an autonomous vehicle capable of communicating with the system of FIG. 1 to receive HD maps.

Referring now to FIG. 4, each autonomous vehicle control system 120 may be embodied as any type of compute system capable of autonomously controlling a corresponding vehicle and performing the functions described herein. In the illustrative embodiment, the autonomous vehicle control system 120 includes compute circuitry 402, an input/output ("I/O") subsystem 412, a data storage 414, a communication subsystem 416, navigation sensors 418, and, optionally, one or more peripheral devices 420. Of course, it should be appreciated that the autonomous vehicle control system 120 may include other or additional components, such as those commonly found in a typical compute device or server, in other embodiments. Additionally, in some embodiments, one or more of the illustrative components may be incorporated in, or otherwise form a portion of, another component.

The compute circuitry 402 may be embodied as any type of device or collection of devices capable of performing various compute functions. In some embodiments, the compute circuitry 402 may be embodied as a single device such as an integrated circuit, an embedded system, a field-programmable-array (FPGA, a system-on-a-chip (SOC), or other integrated system or device. Additionally, in some embodiments, the compute circuitry 402 includes or is embodied as a processor 404 and memory 406. The processor 404 may be embodied as any type of processor capable of performing the functions described herein. For example, the processor 404 may be embodied as a single or multi-core processor(s), digital signal processor, microcontroller, or other processor or processing/controlling circuit. Similarly, the memory 406 may be embodied as any type of volatile or non-volatile memory or data storage capable of performing the functions described herein.

Illustratively, the compute circuitry 402 also includes location circuitry 408 and navigation circuitry 410. The location circuitry 408 may be embodied as any type of circuitry or electronic devices capable of generating data indicative of a present location of the autonomous vehicle 110. For example, in some embodiments, the location circuitry 408 may be embodied as Global Position System (GPS) circuitry. The navigation circuitry 410 may be embodied as any type of circuitry or electronic devices capable of determining a navigation path for the autonomous vehicle 110 and controlling the autonomous vehicle 110 to traverse the determined navigation path.

The compute circuitry 402 is communicatively coupled to other components of the autonomous vehicle control system 120 via the I/O subsystem 412, which may be embodied as circuitry and/or components to facilitate input/output operations with compute circuitry 402 (e.g., with the processor 404 and/or memory 406) and other components of the autonomous vehicle control system 120. For example, the I/O subsystem 412 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 412 may be incorporated, along with the processor 404, the memory 406, and other components of the autonomous vehicle control system 120, into the compute circuitry 402.

The data storage 414 may be embodied as any type of device or devices configured for short-term or long-term storage of data such as, for example, memory devices and circuits, memory cards, hard disk drives, solid-state drives, or other data storage devices. As shown in FIG. 4, the data storage 414 may store map tiles 220, translation mapping 222, and sensor data 430. The map tiles 220 may include proprietary HD map tiles obtained from a proprietary HD map server 104, as well as any interoperable HD map tiles obtained from the interoperable HD map server 102. As discussed above the translation mapping 222 defines a mapping between universal aspects of the interoperable HD map tiles 220 to corresponding aspects of the proprietary HD map tiles usable by the autonomous vehicles 110. In some embodiments, the translation mapping 222 is maintained by the interoperable HD map server 102, and the autonomous vehicle control system 120 may obtain the translation mapping 222 from the interoperable HD map server 102 (e.g., in connection with receipt of an interoperable HD map tile). The sensor data 430 may be embodied as any type of sensor data generated by one or more sensors of the autonomous vehicle control system 120 and which may be crowdsourced to the interoperable HD map server 102 (or edge HD map server 106) as discussed above.

The communication subsystem 416 may be embodied as any type of communication circuit, device, or collection thereof, capable of enabling communications between the autonomous vehicle control system 120 and other components of the system 100 across the network 150. To do so, the communication subsystem 416 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The navigation sensors 418 may be embodied as any type of sensor capable of producing sensor data useful to the navigation circuitry 410 to determine route paths for the autonomous vehicle 110 and transverse the autonomous vehicle 110 along such determined route paths. For example, the navigation sensors 418 may be embodied as, or otherwise include, cameras, radar, LIDAR sensors, optical sensors, audio sensors, and/or other types of navigational sensors.

Additionally, in some embodiments, the autonomous vehicle control system 120 may include one or more peripheral devices 420. Such peripheral devices 420 may include any type of peripheral device commonly found in a compute device or server such as audio input devices, a display, other input/output devices, interface devices, and/or other peripheral devices.

Figure 5:
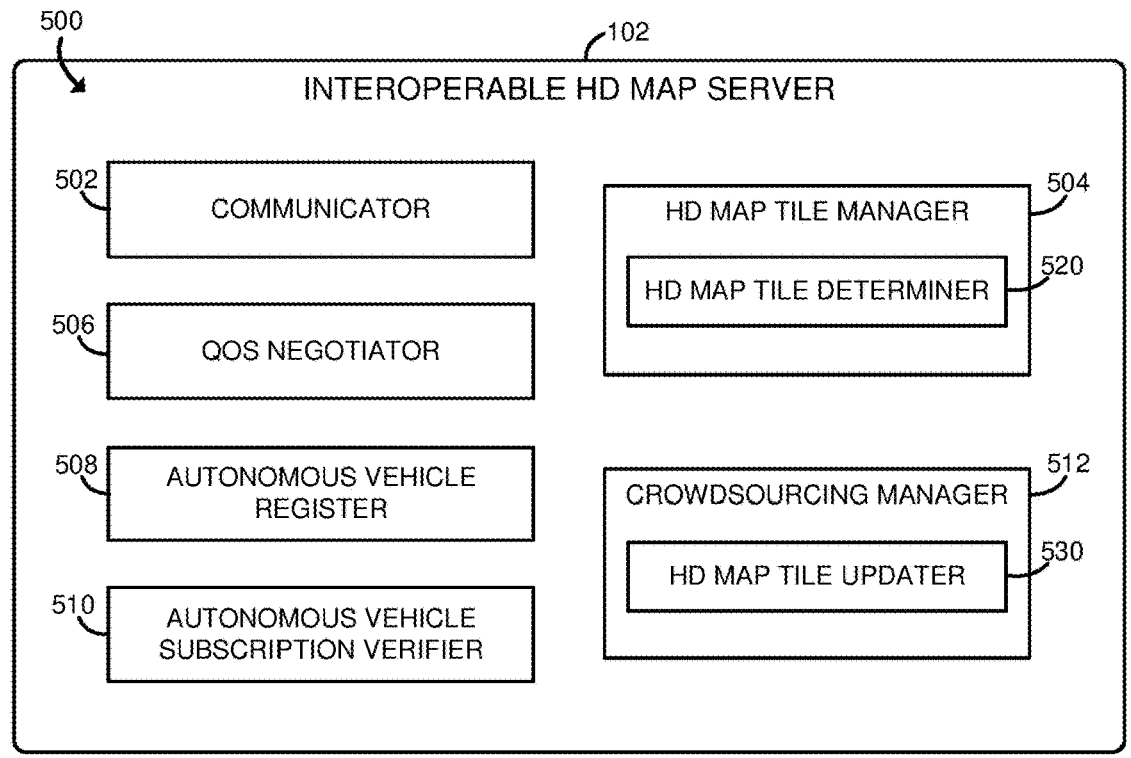
FIG. 5 is a simplified block diagram of at least one embodiment of an environment of the interoperable HD map server of FIGS. 1 and 2.

Referring now to FIG. 5, in use, the interoperable HD map server 102 establishes an illustrative environment 500 during operation. The illustrative environment 500 includes a communicator 502, a HD map tile manager 504, a quality-of-service (QOS) negotiator 506, an autonomous vehicle register 508, an autonomous vehicle subscription verifier 510, and a crowdsourcing manager 512. Each of the various components of the environment 500 may be embodied as hardware, firmware, software, or a combination thereof. As such, in some embodiments, one or more of the components of the environment 500 may be embodied as circuitry or collection of electrical devices (e.g., communicator circuitry 502, HD map tile manager circuitry 504, QOS negotiator circuitry 506, autonomous vehicle register circuitry 508, autonomous vehicle subscription verifier circuitry 510, crowdsourcing manager circuitry 512, etc.). It should be appreciated that one or more functions described herein as being performed by the communicator circuitry 502, the HD map tile manager circuitry 504, the quality-of-service QOS negotiator circuitry 506, the autonomous vehicle register circuitry 508, the autonomous vehicle subscription verifier circuitry 510, and the crowdsourcing manager circuitry 512 may be performed, at least in part, by one or more other components of the interoperable HD map server 102, such as the compute circuitry 202, the I/O subsystem 208, the communication subsystem 212, an ASIC, a programmable circuit such as an FPGA, and/or other components of the interoperable HD map server 102. It should be further appreciated that associated instructions may be stored in the memory 206, the data storage device(s) 210, and/or another data storage location, which may be executed by processor 204 of the compute circuitry 202 and/or other computational processor of the interoperable HD map server 102.

Additionally, in some embodiments, one or more of the illustrative components may form a portion of another component and/or one or more of the illustrative components may be independent of one another. Further, in some embodiments, one or more of the components of the environment 500 may be embodied as virtualized hardware components or emulated architecture, which may be established and maintained by one or more of the compute circuitry 202, the communication subsystem 212, and/or other software/hardware components of the interoperable HD map server 102. It should be appreciated that the environment 500 of the interoperable HD map server 102 may include other components, sub-components, modules, sub-modules, logic, sub-logic, and/or devices commonly found in a computing device (e.g., device drivers, interfaces, etc.), which are not illustrated in FIG. 5 for clarity of the description.

The communicator 502 is configured to manage communications between the interoperable HD map server 102 and the autonomous vehicles 110, the proprietary HD map servers 104, and the edge HD map servers 106. As discussed above, any suitable communication protocol may be used to effect such inter-communications.

The HD map tile manager 504 is configured to store, manage, and update the interoperable HD map tiles in the data storage 210. As discussed above, the interoperable HD map tiles may include HD map tiles for locations not covered by the proprietary HD map server 104 and/or HD map tiles having information (e.g., additional or more detailed information) not available on the proprietary HD map tiles. The HD map tile manager 504 includes an HD map tile determiner 520, which is configured to identify or determine a HD map tile based on a request received from an autonomous vehicle 110. For example, as discussed below, the interoperable HD map server 102 may receive a request for an HD map tile from an autonomous vehicle 110 that includes HD map tile identification information. The HD map tile identification information may be embodied as any type of information from which the interoperable HD map server 102 can determine a corresponding interoperable HD map tile. Such information may include, for example, location information of autonomous vehicle 110 or other information that defines the location for which an interoperable HD map tile is desired.

The QOS negotiator 506 is configured to communicate with the proprietary HD map servers 104, via the communicator 502, and to determine quality of service requirements of the proprietary HD map servers 104 and its associated service. In this way, the interoperable HD map server 102 can ensure the QOS requirements of the proprietary HD map server 104 to which an autonomous vehicle 110 is subscribed are met or otherwise maintained when the interoperable HD map server 102 provides interoperable HD map tiles to the autonomous vehicle 110 (e.g., ensuring the HD map tiles are delivered within a specified time, contain a certain amount of information, etc.).

The autonomous vehicle register 508 is configured to manage registration and/or subscription of autonomous vehicles 110 to the interoperable HD map server 102. Such registration process may involve obtaining identification information related to the autonomous vehicle 110 as well as, for example characteristic data that identifies the autonomous vehicle 110 and/or the owner of the autonomous vehicle 110. In some embodiments, the autonomous vehicle register 508 may use subscription data of the autonomous vehicle 110 with a proprietary HD map server 104 to register the autonomous vehicle 110 with the interoperable HD map server 102.

The autonomous vehicle subscription verifier 510 is configured to receive subscription data indicative of a service subscription to a proprietary HD map server 104 from an autonomous vehicle 110 and communicate with the proprietary HD map server 104 to verify that service subscription. In this way, proprietary HD map servers 104 may offer the service of the interoperable HD map server 102 to its customers without the requirement that those customers have a separate subscription to the interoperable HD map server 102. Rather, the autonomous vehicle subscription verifier 510 merely verifies that the autonomous vehicle 110 requesting an interoperable HD map tile has a valid subscription with its corresponding proprietary HD map server 104. To do so, the autonomous vehicle 110 may transmit the subscription data as part of the interoperable HD map tile request as discussed in more detail below.

The crowdsourcing manager 512 is configured to manage various sensor data received from the autonomous vehicles 110 and/or edge HD map servers 106. For example, the crowdsourcing manager 512 may filter, aggregate, and/or process the variously received sensor data. In some embodiments, the crowdsourcing manager 512 may include an HD map tile updater 530 configured to determine whether to update one or more interoperable HD map tiles based on the crowdsourced data. For example, the HD map tile updater 530 may update an interoperable HD map tile if sensor data form multiple sources indicate a new static object (e.g., a new stop sign) in that location.

Figure 6:
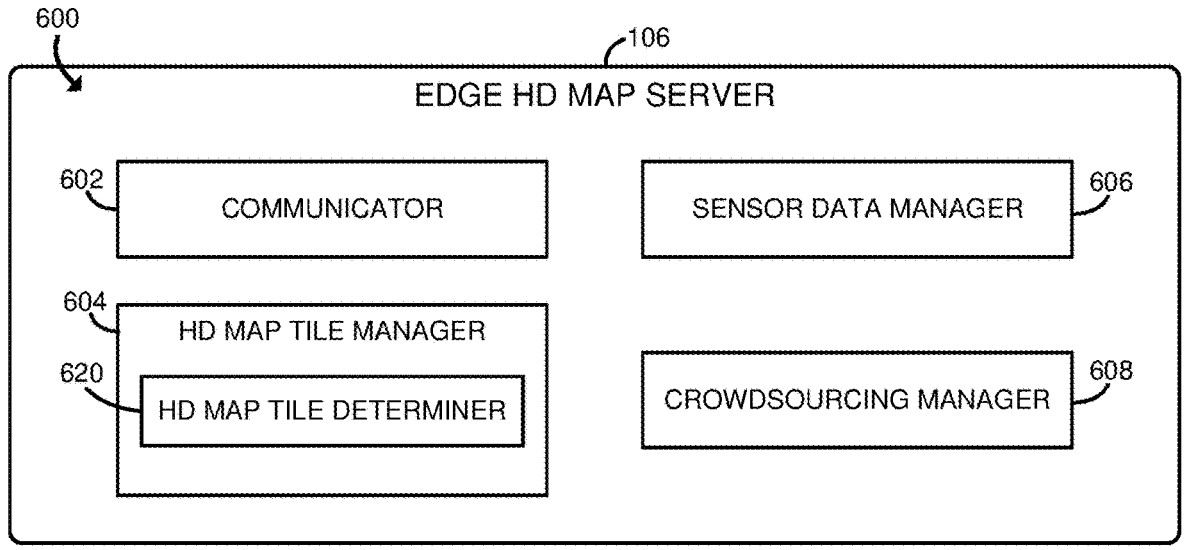
FIG. 6 is a simplified block diagram of at least one embodiment of an environment of the edge HD map server of FIGS. 1 and 3.

Referring now to FIG. 6, in use, each edge HD map server 106 establishes an illustrative environment 600 during operation. The illustrative environment 600 includes a communicator 602, a HD map tile manager 604, a sensor data manager 606, and a crowdsourcing manager 608. Each of the various components of the environment 600 may be embodied as hardware, firmware, software, or a combination thereof. As such, in some embodiments, one or more of the components of the environment 600 may be embodied as circuitry or collection of electrical devices (e.g., communicator circuitry 602, HD map tile manager circuitry 604, sensor data manager circuitry 606, crowdsourcing manager circuitry 608, etc.). It should be appreciated that one or more functions described herein as being performed by the communicator circuitry 602, the HD map tile manager circuitry 604, the sensor data manager circuitry 606, and the crowdsourcing manager circuitry 608 may be performed, at least in part, by one or more other components of the edge HD map server 106, such as the compute circuitry 302, the I/O subsystem 308, the communication subsystem 312, an ASIC, a programmable circuit such as an FPGA, and/or other components of the edge HD map server 106. It should be further appreciated that associated instructions may be stored in the memory 306, the data storage device(s) 210, and/or another data storage location, which may be executed by processor 304 of the compute circuitry 302 and/or other computational processor of the edge HD map server 106.

Additionally, in some embodiments, one or more of the illustrative components may form a portion of another component and/or one or more of the illustrative components may be independent of one another. Further, in some embodiments, one or more of the components of the environment 600 may be embodied as virtualized hardware components or emulated architecture, which may be established and maintained by one or more of the compute circuitry 302, the communication subsystem 312, and/or other software/hardware components of the edge HD map server 106. It should be appreciated that the environment 600 of the edge HD map server 106 may include other components, sub-components, modules, sub-modules, logic, sub-logic, and/or devices commonly found in a computing device (e.g., device drivers, interfaces, etc.), which are not illustrated in FIG. 6 for clarity of the description.

The communicator 602 is configured to manage communications between the edge HD map server 106 and interoperable HD map server 102 and the autonomous vehicles 110. As discussed above, any suitable communication protocol may be used to effect such inter-communications.

The HD map tile manager 604 is configured to receive interoperable HD map tiles from the interoperable HD map server 102 and locally manage those HD map tiles for distribution to requesting autonomous vehicles 110. The HD map tile manager 504 includes an HD map tile determiner 620, which is configured to identify or determine a HD map tile based on a request received from an autonomous vehicle 110, similar to the HD map determiner 520 described above in regard to FIG. 5.

The sensor data manager 606 is configured to capture and aggregate sensor data generated by the local sensors 314. The crowdsourcing manager 608 is configured manage any sensor data received from nearby autonomous vehicles 110 and/or other sensors (including the local sensors 314), aggregate such sensor data, and periodically or responsively transmit the sensor data to the interoperable HD map server 102 as part of the crowdsourcing of sensor data.

Figure 7:
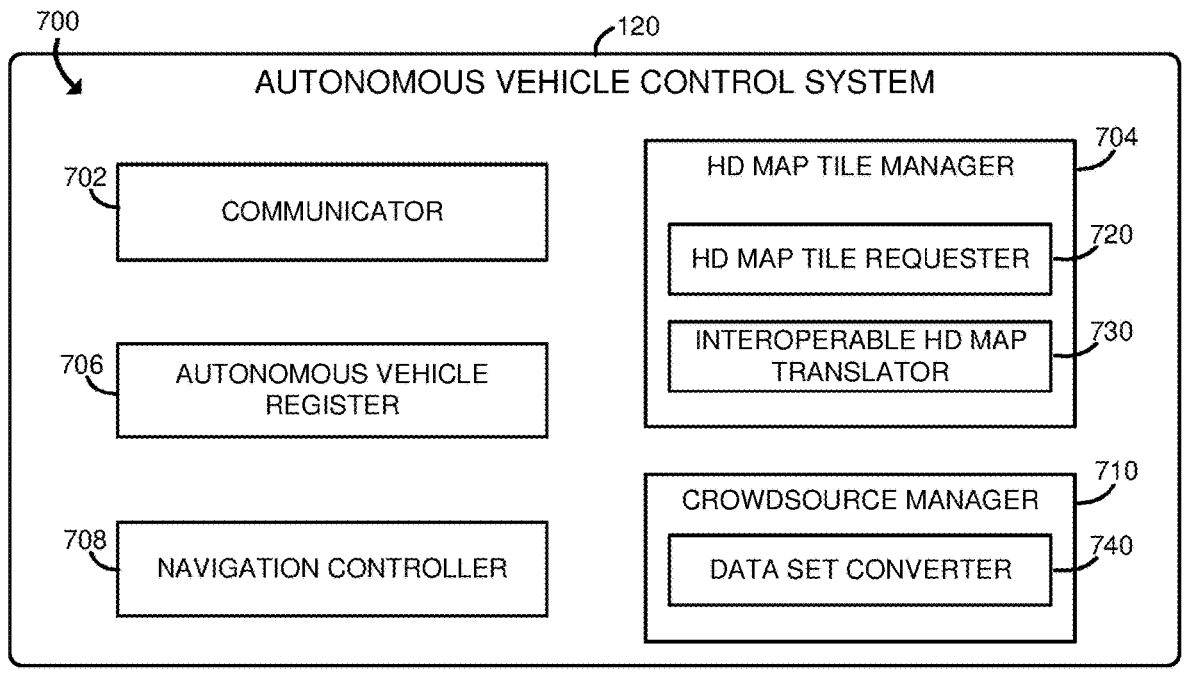
FIG. 7 is a simplified block diagram of at least one embodiment of an environment of the autonomous vehicle control system of FIG. 4.

Referring now to FIG. 7, in use, each autonomous vehicle control system 120 establishes an illustrative environment 700 during operation. The illustrative environment 700 includes a communicator 702, an HD map tile manager 704, an autonomous vehicle register 706, a navigation controller 708, and a crowdsource manager 710. Each of the various components of the environment 700 may be embodied as hardware, firmware, software, or a combination thereof. As such, in some embodiments, one or more of the components of the environment 700 may be embodied as circuitry or collection of electrical devices (e.g., communicator circuitry 702, HD map tile manager circuitry 704, autonomous vehicle register circuitry 706, navigation controller circuitry 708, crowdsource manager circuitry 710, etc.). It should be appreciated that one or more functions described herein as being performed by the communicator circuitry 702, the HD map tile manager circuitry 704, the autonomous vehicle register circuitry 706, the navigation controller circuitry 708, and the crowdsource manager circuitry 710 may be performed, at least in part, by one or more other components of the autonomous vehicle control system 120, such as the compute circuitry 402, the I/O subsystem 412, the communication subsystem 416, an ASIC, a programmable circuit such as an FPGA, and/or other components of the autonomous vehicle control system 120. It should be further appreciated that associated instructions may be stored in the memory 406, the data storage device(s) 414, and/or another data storage location, which may be executed by processor 404 of the compute circuitry 402 and/or other computational processor of the autonomous vehicle control system 120.

Additionally, in some embodiments, one or more of the illustrative components may form a portion of another component and/or one or more of the illustrative components may be independent of one another. Further, in some embodiments, one or more of the components of the environment 700 may be embodied as virtualized hardware components or emulated architecture, which may be established and maintained by one or more of the compute circuitry 402, the communication subsystem 416, and/or other software/hardware components of the autonomous vehicle control system 120. It should be appreciated that the environment 700 of the autonomous vehicle control system 120 may include other components, sub-components, modules, sub-modules, logic, sub-logic, and/or devices commonly found in a computing device (e.g., device drivers, interfaces, etc.), which are not illustrated in FIG. 7 for clarity of the description.

The communicator 702 is configured to manage communications between the autonomous vehicle control system 120 and the interoperable HD map server 102, the proprietary HD map servers 104, and the edge HD map servers 106. As discussed above, any suitable communication protocol may be used to effect such inter-communications.

The HD map tile manager 504 is configured to manage HD map tiles stored on the autonomous vehicle 110 and retrieve desired HD map tiles for use by the navigation controller to control navigation of the autonomous vehicle 110 as discussed below. The HD map tile manager 504 includes an HD map tile requester 720, which is configured to communicate with the proprietary HD map server 104 to request proprietary HD maps for a particular location (e.g., because the autonomous vehicle 110 does not have a local copy of a proprietary HD map tile or desires an updated map tile). If the proprietary HD map server 104 does not have a HD map tile for the requested location, the HD map tile requester 720 is configured to request an interoperable HD map tile from the interoperable HD map server 102.

To facilitate the use of the interoperable HD map tile, the HD map tile manager 704 also includes an interoperable HD map translator 730. The interoperable HD map translator 730 is configured to translate the interoperable HD map tile to a proprietary HD map tile useable by the autonomous vehicle 110. As discussed above the translation mapping 222 defines a mapping between universal aspects of the interoperable HD map tiles 220 to corresponding aspects of the proprietary HD map tiles usable by the autonomous vehicles 110.

The autonomous vehicle register 706 is configured to manage registration and/or subscription of the autonomous vehicle 110 with the interoperable HD map server 102. As discussed above, the registration process may involve transmitting identification information related to the autonomous vehicle 110 as well as, for example characteristic data that identifies the autonomous vehicle 110 and/or the owner of the autonomous vehicle 110. In some embodiments, the autonomous vehicle register 706 may use subscription data of the autonomous vehicle 110 with a proprietary HD map server 104 to register the autonomous vehicle 110 with the interoperable HD map server 102.

The navigation controller 708 is configured to control the navigation circuitry 410 and manage the navigation sensors 418 to determine a navigation path for the autonomous vehicle 110 and control the autonomous vehicle 110 to traverse the determined navigation path.

The crowdsource manager 710 is configured to manage, collect, and or aggregate various sensor data generated by sensors of the autonomous vehicle 110 and share the collected sensor data with the interoperable HD map server 102. To do so, the crowdsource manager 720 includes a data set converter 740, which is configured to convert the native sensor data generated by the sensors of the autonomous vehicle 110 (e.g., the navigation sensors 418) to a format usable by the interoperable HD map server 102. The data set converter 740 may format the collected sensor data by converting the sensor data to a universal data structure (e.g., by representing numbers in particular way, ordering the sensor data in particular way, etc.) and storing the converted sensor data in a pre-defined, universal data set. The crowdsource manager 710 may subsequently transmit the universal data set to the interoperable HD map server 102 as discussed in more detail below.

Figure 8:
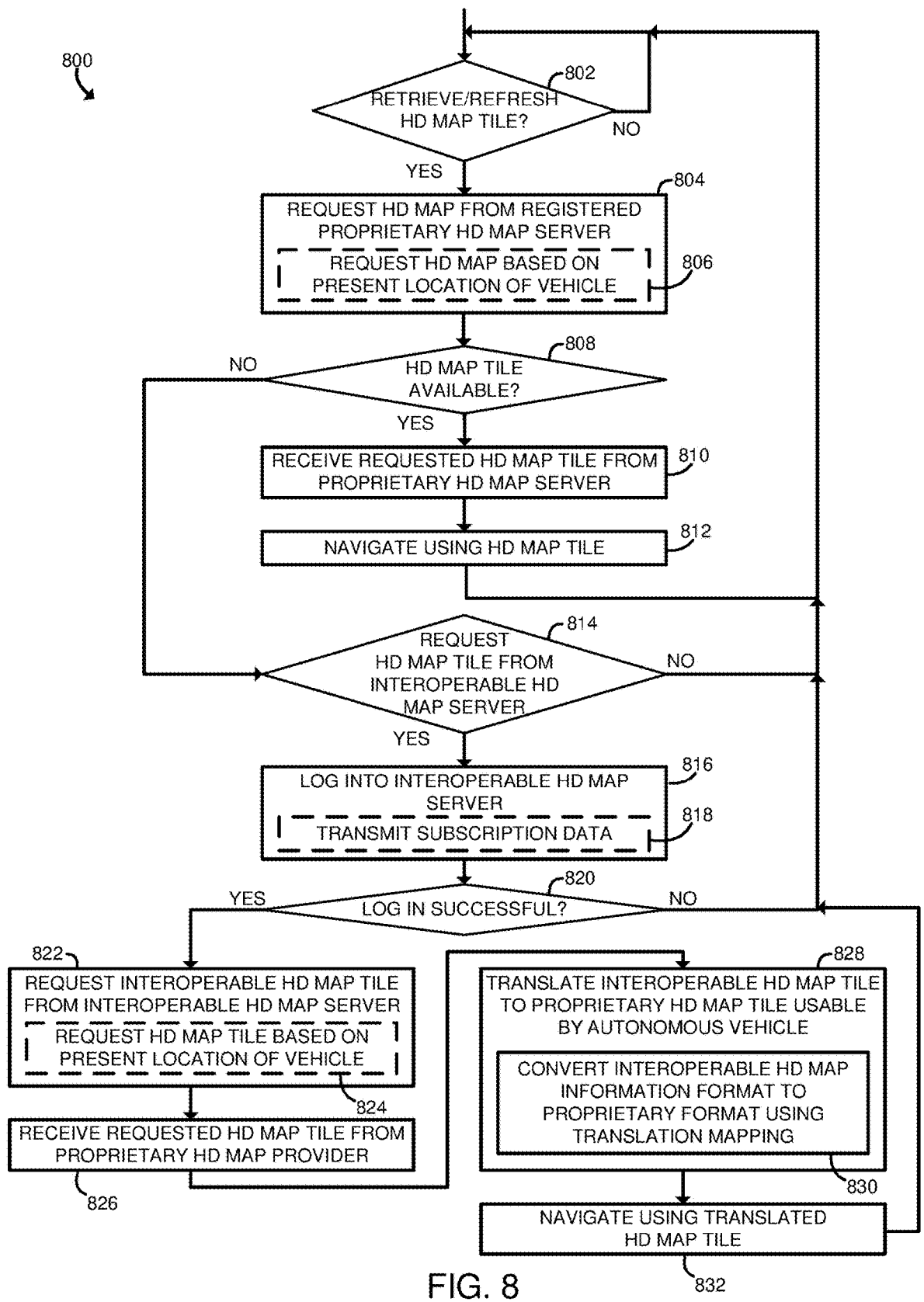
FIG. 8 is a simplified block diagram of at least one embodiment of method for obtaining HD map tiles of a location, which may be executed by the autonomous vehicle control system of FIGS. 4 and 7.

Referring now to FIG. 8, in use, the autonomous vehicle control system 120 of each autonomous vehicle 110 may perform a method 800 for obtaining HD map tiles of a location. The method 800 begins with block 802 in which the autonomous vehicle control system 120 determines whether to retrieve and/or refresh an HD map tile for a particular location. For example, the autonomous vehicle control system 120 may determine to request an HD map tile if the autonomous vehicle control system 120 does not have an HD map tile for the current location or a predicted location of the autonomous vehicle 110.

If the autonomous vehicle control system 120 determines to request or refresh an HD map tile, the method 800 advances to block 804 in which the autonomous vehicle control system 120 requests a proprietary HD map tile from the proprietary HD map server 104 to which it is subscribed. To do so, in block 806, the autonomous vehicle control system 120 may request the HD map tile based on the present or predicted location of the vehicle. For example, the autonomous vehicle control system 120 may transmit location data indicative of the present or predicted location to the proprietary HD map server 104 as part of the HD map tile request.

In block 808, the autonomous vehicle control system 120 determines whether the requested proprietary HD map tile is available from the proprietary HD map server 104. If so, the method 800 advances to block 810 in which the autonomous vehicle control system 120 receives the requested proprietary HD map tile from the proprietary HD map server 104. In block 812, the autonomous vehicle control system 120 may perform navigation of the autonomous vehicle control system 120 using the received proprietary HD map tile, and the method 800 loops back to block 802 in which the autonomous vehicle control system 120 again determines whether to retrieve and/or refresh an HD map tile for a new location.

Referring back to block 808, if the autonomous vehicle control system 120 determines that the requested proprietary HD map tile is not available from the proprietary HD map server 104, method 800 advances to block 814. In block 814, the autonomous vehicle control system 120 determines whether to request an interoperable HD map tile for the current location or a predicted location of the autonomous vehicle 110 from the interoperable HD map server 102. If not, the method 800 loops back to block 802 in which the autonomous vehicle control system 120 again determines whether to retrieve and/or refresh an HD map tile for a location.

If, however, the autonomous vehicle control system 120 determines to request the desired interoperable HD map tile from the interoperable HD map server 102, the method 800 advances to block 816. In block 816, the autonomous vehicle control system 120 logs into the interoperable HD map server 102. To do so, the autonomous vehicle control system 120 may transmit subscription data to the interoperable HD map server 102 in block 818. In the illustrative embodiment, the subscription data is embodied as data indicative of the subscription of the autonomous vehicle 110 with its corresponding proprietary HD map server 104. As discussed above, the interoperable HD map server 102 utilizes the subscription data to verify the autonomous vehicle 110 has a valid subscription with the proprietary HD map server 104 prior to providing an interoperable HD map tile to the requesting autonomous vehicle control system 120.

In block 820, the autonomous vehicle control system 120 determines if the login process was successful. If not, the method 800 loops back to block in which the autonomous vehicle control system 120 again determines whether to retrieve and/or refresh an HD map tile for a location. If, however, the login process was successful, the method 800 advances to block 822 in which the autonomous vehicle control system 120 requests the desired interoperable HD map tile from the interoperable HD map server 102. To do so, the autonomous vehicle control system 120 may request the interoperable HD map tile based on the present location of the vehicle. For example, the autonomous vehicle control system 120 may transmit location data to the interoperable HD map server 102 indicative of the present or predict location of the autonomous vehicle 110 or from which such location can be determined.

In bock 826, the autonomous vehicle control system 120 receives the interoperable HD map tile from the interoperable HD map sever 102 (if an interoperable HD map tile is available for the desired location). As discussed above, the interoperable HD map tile may not be directly usable by the autonomous vehicle control system 120 because the interoperable HD map tile is formatted in a universal format and not the proprietary format used by the proprietary HD map server 104. As such, in block 828, the autonomous vehicle control system 120 translates the interoperable HD map tile to a proprietary HD map tile usable the autonomous vehicle control system 120. To do so, in block 830, the autonomous vehicle control system 120 converts the interoperable HD map information format to a proprietary format using the translation mapping 222 stored in the data storage 210.

After the interoperable HD map tile has been converted to the proprietary HD map tile, the method 800 advances to block 832 in which the autonomous vehicle control system 120 performs navigation of the autonomous vehicle 110 using the converted proprietary HD map tile, and the method 800 loops back to block 802 in which the autonomous vehicle control system 120 again determines whether to retrieve and/or refresh an HD map tile for a new location.

Figure 9:
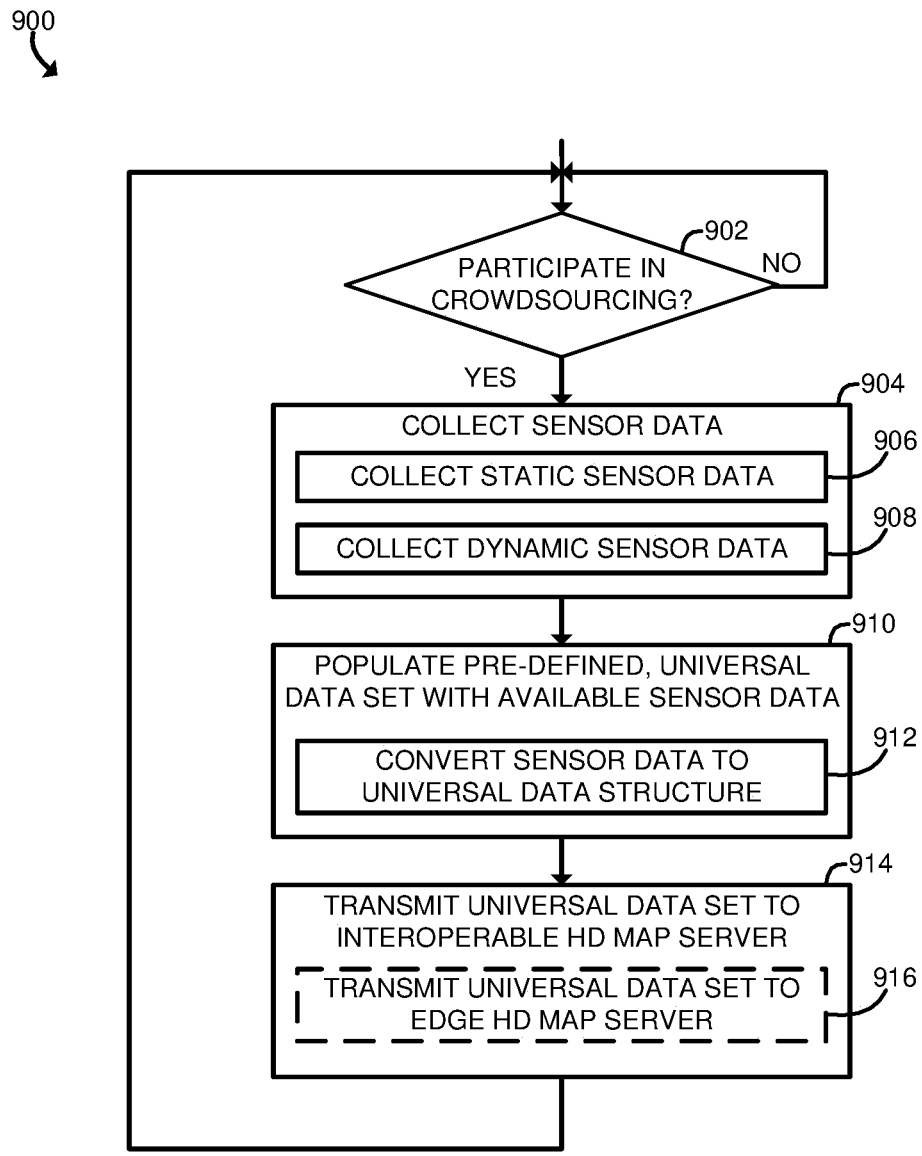
FIG. 9 is a simplified block diagram of at least one embodiment of method for providing HD map data to an interoperable HD map server, which may be executed by the autonomous vehicle control system of FIGS. 4 and 7.

Referring now to FIG. 9, in use, the autonomous vehicle control system 120 of each autonomous vehicle 110 may perform a method 900 for providing HD map data to the interoperable HD map server 102. The method 900 begins with block 902 in which the autonomous vehicle control system 120 determines whether to participate in crowdsourcing for the interoperable HD map server 102. If so, the method 900 advances to block 904 in which the autonomous vehicle control system 120 collects sensor data. For example, the autonomous vehicle control system 120 may collect sensor data generated by sensors of the autonomous vehicle 110 as the autonomous vehicle 110 traverses a present location. The particular sensor data collected may be based on the available sensors of the autonomous vehicle 110 and or other criteria. For example, in block 906, the autonomous vehicle control system 120 may collect static sensor data, such as data indicative of fixed structure, traffic signs, roadway, curbs, streetlights, and other fixed or non-moving objects. Additionally or alternatively, in block 908, the autonomous vehicle control system 120 may collect dynamic sensor data, such as data indicative of moving objects within the location (e.g., other vehicles, pedestrians, bicyclists, etc.).

In block 910, the autonomous vehicle control system 120 populates a pre-defined, universal data set with the available sensor data. As discussed above, the universal data set may have defined locations for defined types of sensor data so as to organize the sensor data and ensure a uniform reporting of the sensor data by different autonomous vehicles 110. In block 912, the autonomous vehicle control system 120 converts the sensor data to a universal data structure. For example, the universal data structure may dictate the format of the sensor data (e.g., how numbers are to be represented, available terms to describe objects, etc.).

After the universal data set has been populated with the converted sensor data, the method 900 advances to block 914 in which the autonomous vehicle control system 120 transmits the universal data set to the interoperable HD map server 102. As discussed below, the interoperable HD map server 102 may aggregate the crowdsourced sensor data received from multiple sources for a particular location and update or validate an interoperable HD map tile associated with that particular location. In some embodiments, in block 916 the autonomous vehicle control system 120 may transmit the universal data set to the edge HD map server 106 rather than or in addition to the interoperable HD map server 102. In either case, after the universal data set has been transmitted, the method 900 loops back to block 902 in which the autonomous vehicle control system 120 again determines whether to participate in crowdsourcing for the interoperable HD map server 102.

Figure 10:
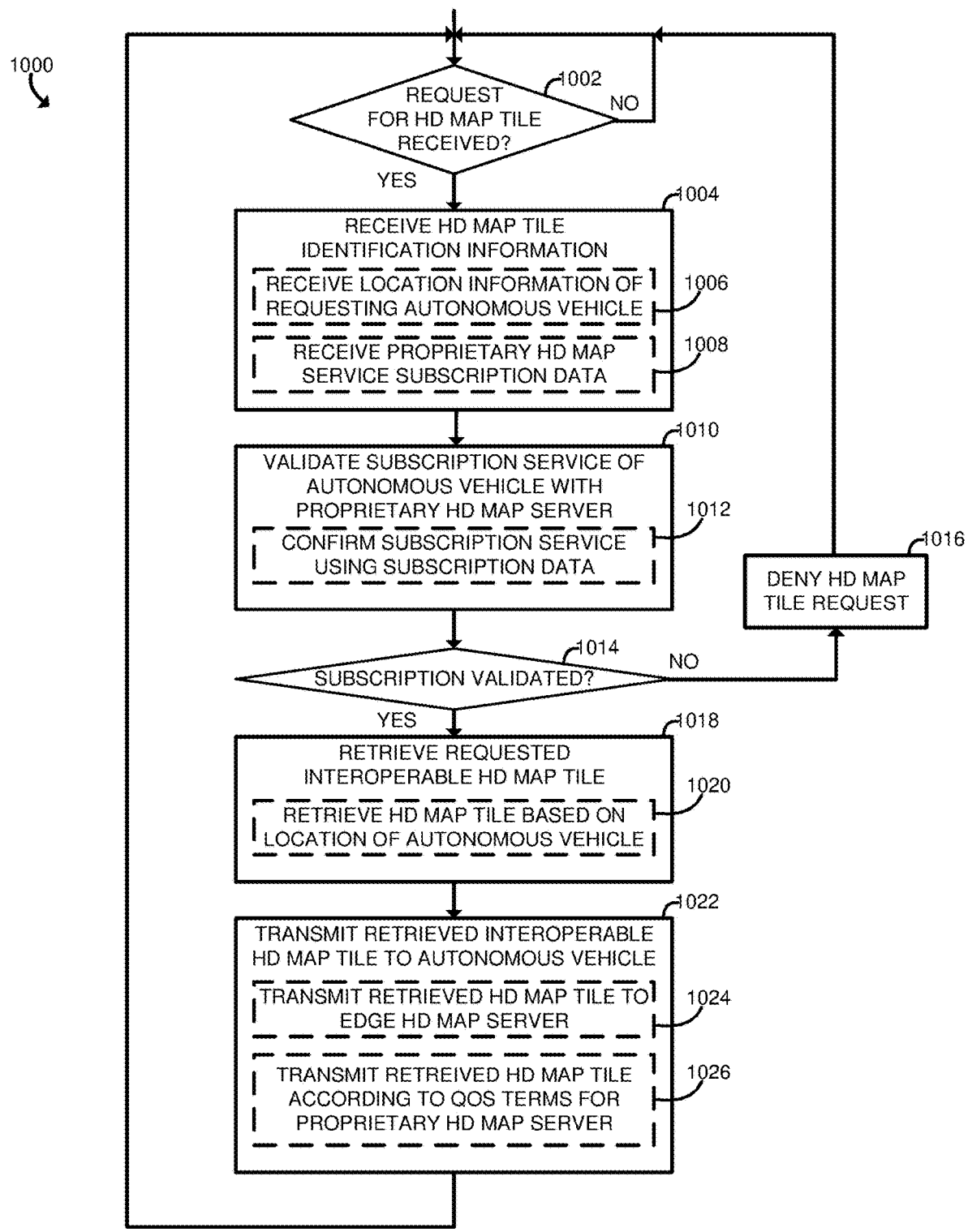
FIG. 10 is a simplified block diagram of at least one embodiment of a method for distributing interoperable HD map tiles, which may be executed by interoperable HD map server of FIGS. 1, 2 and 5.

Referring now to FIG. 10, in use, the interoperable HD map server 102 may execute a method 1000 for distributing interoperable HD map tiles. The method 1000 begins with block 1002 in which the interoperable HD map server 102 determines whether a request for an interoperable HD map tile has been received from an autonomous vehicle 110. If so, the method 1000 advances to block 1004 in which the interoperable HD map server 102 receives HD map tile identification information, which is usable by the interoperable HD map server 102 to determine which interoperable HD map tile to retrieve. For example, in block 1006, the interoperable HD map server 102 may receive location information of the requesting autonomous vehicle 110, which the interoperable HD map server 102 may utilize to determine the interoperable HD map tile corresponding to that location. As discussed above, the location information may be indicative of a present or predicted location of the requesting autonomous vehicle 110. Along with the location information, the interoperable HD map server 102 may also receive subscription data indicative of a service subscription of the requesting autonomous vehicle 110 with a corresponding proprietary HD map server 104 in block 1008.

In block 1010, the interoperable HD map server 102 validates the subscription service of the autonomous vehicle with the corresponding proprietary HD map server 104. To do so, in block 1012, the interoperable HD map server 102 may communicate with the proprietary HD map server 104 and confirm the autonomous vehicle 110 has a valid subscription using the subscription data received from the autonomous vehicle 110. The interoperable HD map server 102 determines whether the subscription service of the autonomous vehicle 110 is valid. If not, the method 1000 advances to block 1016 in which the interoperable HD map server 102 denies the request from the autonomous vehicle 110 for the interoperable HD map tile. The method 1000 subsequently loops back to block 1002 in which the interoperable HD map server 102 determines whether a new request for an interoperable HD map tile has been received.

If, however, the subscription of the requesting autonomous vehicle 110 is valid, the method 1000 advances to block 1018 in which the interoperable HD map server 102 retrieves the requested interoperable HD map tile. To do so, in block 1020, the interoperable HD map server 102 may retrieve the interoperable HD map tile based on the location information provided in the request from the autonomous vehicle 110.

In block 1022, the interoperable HD map server 102 transmits the retrieved interoperable HD map tile to the requesting autonomous vehicle 110. In some embodiments, the interoperable HD map server 102 may transmit the retrieved interoperable HD map tile directly to the requesting autonomous vehicle 110 over the network 150. Alternatively, in block 1024, the interoperable HD map server 102 may transmit the requested interoperable HD map tile to the edge HD map server 106, which may propagate the interoperable HD map tile to the requesting autonomous vehicle 110. Additionally, in block 1026, the interoperable HD map server 102 may transmit the requested interoperable HD map tile to the autonomous vehicle 110, either directly or through the edge HD map server and/or content delivery system 160, in such a way as to satisfy pre-negotiated QOS terms for the proprietary HD map server 104 subscribed to by the requesting autonomous vehicle 110. After delivery of the requested interoperable HD map tile to the requesting autonomous vehicle, the method 1000 loops back to block 1002 in which the interoperable HD map server 102 determines whether a new request for an interoperable HD map tile has been received.

Figure 11:
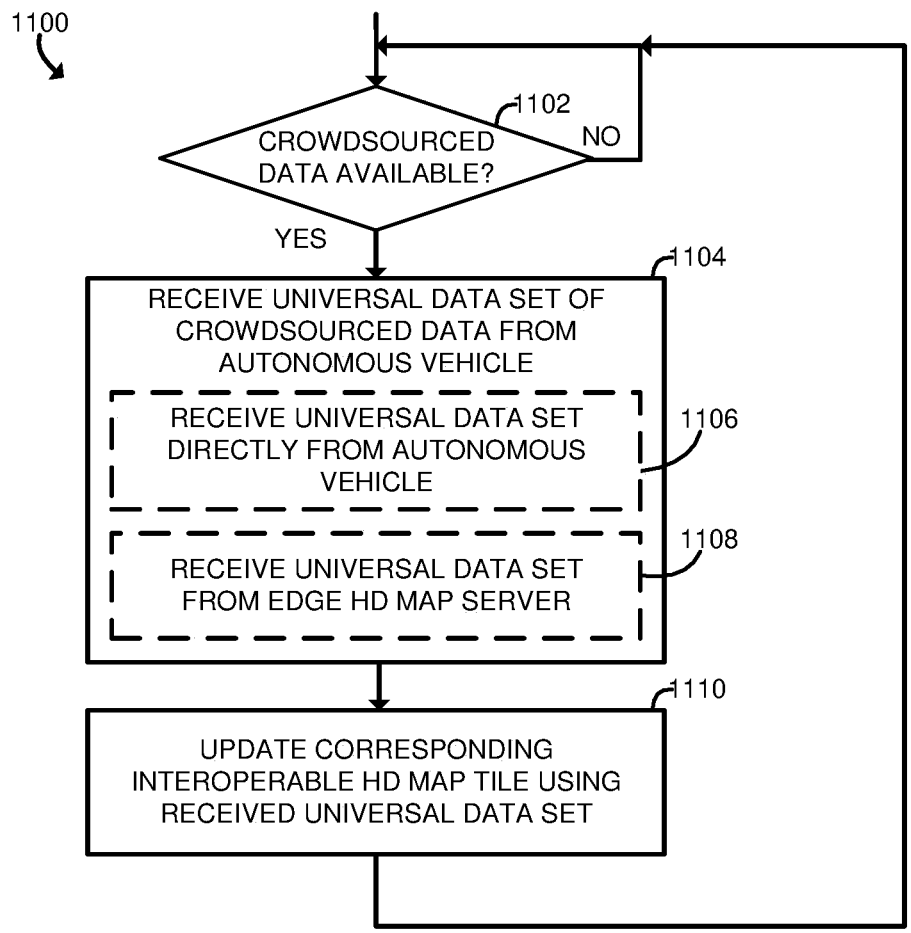
FIG. 11 is a simplified block diagram of at least one embodiment of a method for acquiring HD map data from diverse autonomous vehicles, which may be executed by interoperable HD map server of FIGS. 1, 2 and 5.

Referring now to FIG. 11, in use, the interoperable HD map server 102 may perform a method 1100 for acquiring HD map data. The method 1100 begins with block 1102 in which the interoperable HD map server 102 determines whether any crowdsourced sensor data is available. For example, as discussed above, the autonomous vehicles 110 and/or the edge HD map server 106 may periodically transmit aggregated sensor data to the interoperable HD map server 102. Of course, in some embodiments, the interoperable HD map server 102 may poll the autonomous vehicles 110 and/or the edge HD map server 106 to obtain any new crowdsourced sensor data. Regardless, if new crowdsourced data is available, the method 1100 advances to block 1104. In block 1104, the interoperable HD map server 102 receives the universal data set of crowdsourced data from the autonomous vehicle 110. In some embodiments, in block 1106, the interoperable HD map server 102 may receive the universal data set directly from the autonomous vehicles 110 or from the edge HD map server(s) 106 in block 1108. Regardless, in block 1110, the interoperable HD map server 102 may update a corresponding interoperable HD map tile using the received universal data set of crowdsourced sensor data. The method 1100 subsequently loops back to block 1102 in which the interoperable HD map server 102 again determines whether any crowdsourced sensor data is available.

Figure 12:
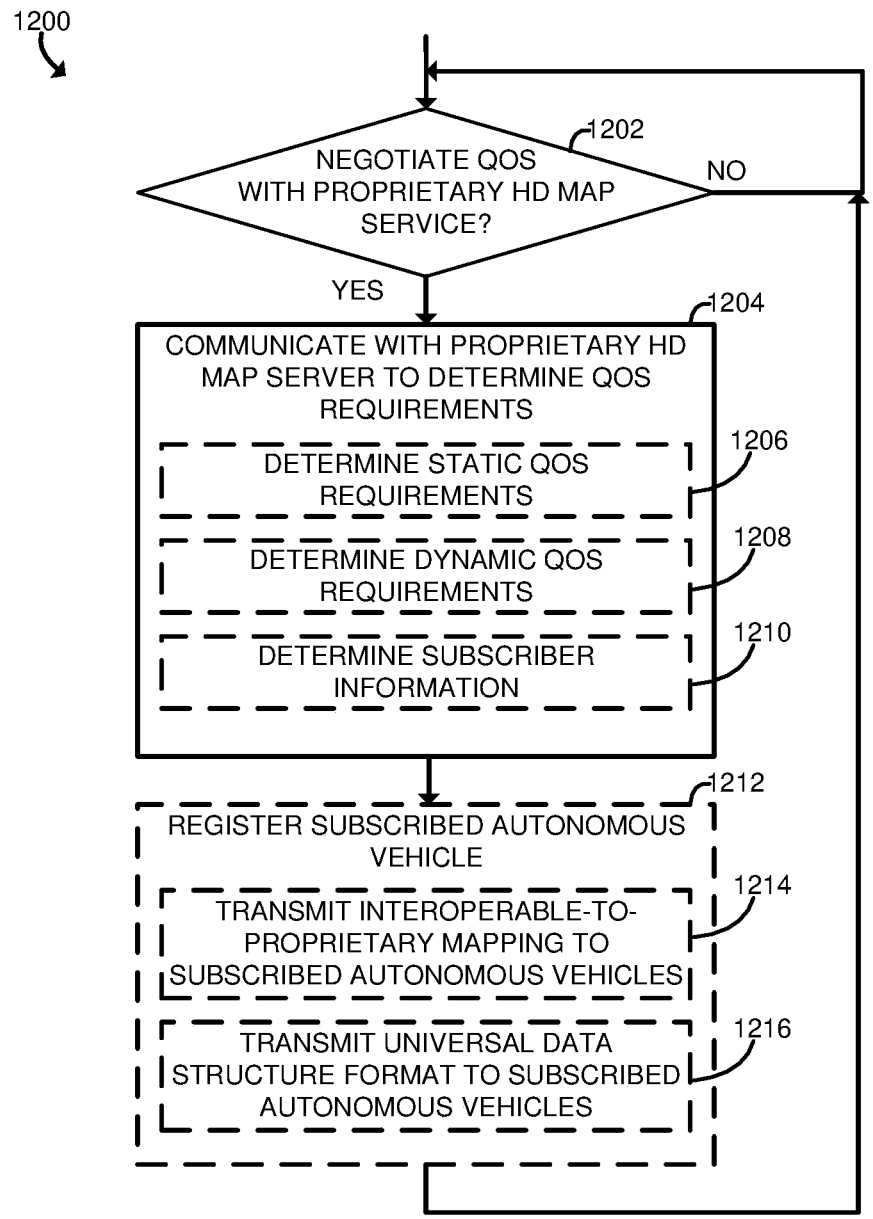
FIG. 12 is a simplified block diagram of at least one embodiment of a method for negotiating quality-of-service (QOS) requirements with a proprietary HD map server, which may be executed by interoperable HD map server of FIGS. 1, 2 and 5.

Referring now to FIG. 12, in use, the interoperable HD map server 102 may perform a method 1200 for negotiating QOS requirements with a proprietary HD map server 104. The method 1200 begins with block 1202 in which the interoperable HD map server 102 determines whether to negotiate QOS terms with a proprietary HD map server 104. If so, the method 1200 advances to block 1204 in which the interoperable HD map server 102 communicates with the proprietary HD map server 104 to determine the QOS requirements of its subscription service. For example, the interoperable HD map server 102 may determine static QOS requirements in block 1206 and/or dynamic QOS requirements in 1208. Additionally, in block 1210, the interoperable HD map server 102 may determine or receive subscriber information. The subscriber information may be indicative of a subscription of an autonomous vehicle 110 to an HD map tile service provided by the proprietary HD map server 104.

In some embodiments, in block 1212, the interoperable HD map server 102 may register the autonomous vehicle 110 subscribed to that particular proprietary HD map server 104 suing the subscription service obtained in block 1210. In such embodiments, the interoperable HD map server 102 may transmit an operable-to-proprietary translation mapping to the subscribed autonomous vehicle 110, which is usable to convert the interoperable HD map tiles to proprietary HD map tiles usable by the autonomous vehicle 110 as discussed above. Additionally in block 1216, the interoperable HD map server 102 may transmit the universal data structure format to the subscribed autonomous vehicle 110, which may be used by the subscribed autonomous vehicle 110 to share crowdsourced sensor data as discussed above. The method 1200 subsequently loops back to block 1202 in which the interoperable HD map server 102 may determine whether to negotiate QOS terms with another proprietary HD map server 104.

EXAMPLES

Illustrative examples of the technologies disclosed herein are provided below. An embodiment of the technologies may include any one or more, and any combination of, the examples described below.

Example 1 includes a high definition (HD) map server. The HD map server may include a data storage having stored therein a plurality of interoperable HD map tiles, wherein each of the interoperable HD map tiles is usable by a plurality autonomous vehicles to perform navigation functions and wherein each of the plurality of autonomous vehicles is configured to utilize a different proprietary HD map tile having a different proprietary format from each other to perform navigation functions; and compute circuitry to (i) receive a request from a first autonomous vehicle of the plurality of autonomous vehicles for an interoperable HD map tile, (ii) retrieve the interoperable HD map tile from the data storage based on the request, and (iii) transmit the interoperable HD map tile to the first autonomous vehicle to facilitate navigation of the first autonomous vehicle.

Example 2 includes the subject matter of Example 1, and wherein to receive the request for the interoperable HD map tile comprises to receive identification information usable to identify the requested interoperable HD map tile from the plurality of interoperable HD map tiles.

Example 3 includes the subject matter of Examples 1 or 2, and wherein to receive identification information comprises to receive location information of the first autonomous vehicle, and wherein to retrieve the interoperable HD map tile comprises to retrieve the interoperable map tile based on the location information of the first autonomous vehicle Example 4 includes the subject matter of any of Examples 1-3, and wherein the compute circuitry is further to validate, prior to transmittal of the interoperable HD map tile to the first autonomous vehicle, a subscription service of the autonomous vehicle with a proprietary HD map server, wherein the proprietary HD map server provides proprietary HD maps to the autonomous vehicle according to the subscription service, and wherein to transmit the interoperable HD map tile comprises to transmit the interoperable HD map tile to the first autonomous vehicle in response to validation of the subscription service of the autonomous vehicle with the proprietary HD map server.

Example 5 includes the subject matter of any of Examples 1-4, and wherein to transmit the interoperable HD map tile comprises to transmit the interoperable HD map tile to the first autonomous vehicle according to a quality-of-service agreement between the HD map server and the proprietary HD map server.

Example 6 includes the subject matter of any of Examples 1-5, and wherein the compute circuitry is further to receive a universal data set including sensor data generated by the first autonomous vehicle, wherein the sensor data is converted to a universal data structure of the universal data set relative to a data structure of the sensor data usable by the autonomous vehicle.

Example 7 includes the subject matter of any of Examples 1-6, and wherein the compute circuitry is further to receive a request from a second autonomous vehicle of the plurality of autonomous vehicles for the interoperable HD map tile, wherein the second autonomous vehicle is configured to utilize proprietary HD map tiles having a second proprietary format different from a first proprietary format of proprietary HD map tiles usable by the first autonomous vehicle to perform navigation functions, and transmit the interoperable HD map tile to the second autonomous vehicle to facilitate navigation of the second autonomous vehicle.

Example 8 includes one or more machine-readable storage media comprising a plurality of instructions stored thereon that, when executed, cause a high definition (HD) map server to receive a request from a first autonomous vehicle of a plurality of autonomous vehicles for an interoperable HD map tile; retrieve, based on the request, the interoperable HD map tile from a plurality of interoperable HD map tiles stored on a data storage of the HD map server, wherein each of the interoperable HD map tiles is usable by a plurality autonomous vehicles to perform navigation functions and wherein each of the plurality of autonomous vehicles is configured to utilize a different proprietary HD map tile having a different proprietary format from each other to perform navigation functions; and transmit the interoperable HD map tile to the first autonomous vehicle to facilitate navigation of the first autonomous vehicle.

Example 9 includes the subject matter of Example 8, and wherein to receive the request for the interoperable HD map tile comprises to receive identification information usable to identify the requested interoperable HD map tile from the plurality of interoperable HD map tiles.

Example 10 includes the subject matter of Example 8 or 9, and wherein to receive identification information comprises to receive location information of the first autonomous vehicle, and wherein to retrieve the interoperable HD map tile comprises to retrieve the interoperable map tile based on the location information of the first autonomous vehicle Example 11 includes the subject matter of any of Examples 8-10, and wherein the plurality of instructions, when executed, further cause the HD map server to validate, prior to transmittal of the interoperable HD map tile to the first autonomous vehicle, a subscription service of the autonomous vehicle with a proprietary HD map server, wherein the proprietary HD map server provides proprietary HD maps to the autonomous vehicle according to the subscription service, and wherein to transmit the interoperable HD map tile comprises to transmit the interoperable HD map tile to the first autonomous vehicle in response to validation of the subscription service of the autonomous vehicle with the proprietary HD map server.

Example 12 includes the subject matter of any of Examples 8-11, and wherein to transmit the interoperable HD map tile comprises to transmit the interoperable HD map tile to the first autonomous vehicle according to a quality-of-service agreement between the HD map server and the proprietary HD map server.

Example 13 includes the subject matter of any of Examples 8-12, and wherein the plurality of instructions, when executed, further cause the HD map server to receive a universal data set including sensor data generated by the first autonomous vehicle, wherein the sensor data is converted to a universal data structure of the universal data set relative to a data structure of the sensor data usable by the autonomous vehicle.

Example 14 includes the subject matter of any of Examples 8-13, and wherein the plurality of instructions, when executed, further cause the HD map server to receive a request from a second autonomous vehicle of the plurality of autonomous vehicles for the interoperable HD map tile, wherein the second autonomous vehicle is configured to utilize proprietary HD map tiles having a second proprietary format different from a first proprietary format of proprietary HD map tiles usable by the first autonomous vehicle to perform navigation functions, and transmit the interoperable HD map tile to the second autonomous vehicle to facilitate navigation of the second autonomous vehicle.

Example 15 includes an on-board vehicle control system of an autonomous vehicle, The on-board vehicle control system comprising a data storage having stored therein one or more proprietary high definition (HD) map tiles, wherein each of the one or more proprietary HD map tiles is usable by the autonomous vehicle to perform navigation functions and is formatted according to a proprietary format usable by the autonomous vehicle; and a compute circuitry to determine whether an HD map tile of the plurality of proprietary HD map tiles is available for a desired location; request, in response to a determination that a proprietary HD map tile is not available for the desired location, an interoperable HD map tile for the desired location from an interoperable HD map server; receive, from the interoperable HD map server, the requested interoperable HD map tile; translate the interoperable HD map tile to the proprietary format usable by the autonomous vehicle; and perform a navigation function using the translated interoperable HD map tile.

Example 16 includes the subject matter of Example 15, and wherein to determine whether an HD map tile of the plurality of proprietary HD map tiles is available for a desired location comprises to request the HD map tile from a proprietary HD map server with which the autonomous vehicle is subscribed.

Example 17 includes the subject matter Examples 15 or 16, and wherein to translate the interoperable HD map tile comprises to translate the interoperable HD map tile to the proprietary format using a translation mapping, wherein the translation mapping defines a mapping between universal aspects of the interoperable HD map tile to corresponding aspects of the proprietary format.

Example 18 includes the subject matter of Examples 15-17, and further comprising a sensor to generate sensor data, and wherein the compute circuitry is further to populate a universal data set with the sensor data, wherein to populate the universal data set comprises to store the sensor data in a corresponding location of the universal data set.

Example 19 includes the subject matter of Examples 15-18, and wherein to populate the universal data set comprises to convert the sensor data to a universal data structure prior to storing the sensor data in the corresponding location of the universal data set.

Example 20 includes the subject matter of Examples 15-19, and wherein to request the interoperable HD map tile comprises to transmit subscription information of a subscription service of the autonomous vehicle with a proprietary HD map server, wherein the proprietary HD map server provides the one or more proprietary HD map tiles to the autonomous vehicle.

Example 21 includes one or more machine-readable storage media comprising a plurality of instructions stored thereon that, when executed, cause an on-board vehicle control system of an autonomous vehicle to determine whether a proprietary HD map tile is available for a desired location, wherein the proprietary HD map tile is usable by the autonomous vehicle to perform navigation functions and is formatted according to a proprietary format usable by the autonomous vehicle; request, in response to a determination that a proprietary HD map tile is not available for the desired location, an interoperable HD map tile for the desired location from an interoperable HD map server; receive, from the interoperable HD map server, the requested interoperable HD map tile; translate the interoperable HD map tile to the proprietary format usable by the autonomous vehicle; and perform a navigation function using the translated interoperable HD map tile.

Example 22 includes the subject matter of Example 21, and wherein to determine whether an HD map tile of the plurality of proprietary HD map tiles is available for a desired location comprises to request the HD map tile from a proprietary HD map server with which the autonomous vehicle is subscribed.

Example 23 includes the subject matter of Examples 21 or 22, and wherein to translate the interoperable HD map tile comprises to translate the interoperable HD map tile to the proprietary format using a translation mapping, wherein the translation mapping defines a mapping between universal aspects of the interoperable HD map tile to corresponding aspects of the proprietary format.

Example 24 includes the subject matter of any of Examples 21-23, and wherein the plurality of instructions, when executed, further cause the on-board vehicle control system populate a universal data set with sensor data generated by a sensor of the autonomous vehicle, wherein to populate the universal data set comprises to store the sensor data in a corresponding location of the universal data set.

Example 25 includes the subject matter of any of Examples 21-24, and wherein to populate the universal data set comprises to convert the sensor data to a universal data structure prior to storing the sensor data in the corresponding location of the universal data set.

Example 26 includes the subject matter of any of Examples 21-25, and wherein to request the interoperable HD map tile comprises to transmit subscription information of a subscription service of the autonomous vehicle with a proprietary HD map server, wherein the proprietary HD map server provides the one or more proprietary HD map tiles to the autonomous vehicle.

The invention claimed is:

1. At least one non-transitory machine-readable storage medium comprising instructions, which when executed by processor circuitry of a computing system, cause the processor circuitry to perform operations to:
obtain crowdsourced sensor data collected from respective autonomous vehicles at a location represented in an interoperable map, wherein the respective autonomous vehicles use data from the interoperable map for navigation at the location, and wherein the respective autonomous vehicles use data from a proprietary map for at least one additional service at the location;
compare information observed from the crowdsourced sensor data to information in the interoperable map or the proprietary map to identify a change at the location;
update data in at least one of the interoperable map or the proprietary map, based on the change at the location, to establish an updated map to be used by a subsequent autonomous vehicle to perform navigation at the location; and
provide the updated map to a map server for distribution to the subsequent autonomous vehicle, to enable the subsequent autonomous vehicle to perform navigation based on the updated map.

2. The non-transitory machine-readable storage medium of claim 1, wherein the data from the proprietary map is provided in a proprietary format.

3. The non-transitory machine-readable storage medium of claim 1, wherein the change in the location relates to a new or changed object in the location.

4. The non-transitory machine-readable storage medium of claim 3, wherein the object is a road sign or a lane feature.

5. The non-transitory machine-readable storage medium of claim 1, wherein the updated map includes an identification of the location.

6. The non-transitory machine-readable storage medium of claim 1, wherein the data from the interoperable map is provided in a format based on a universal data structure.

7. The non-transitory machine-readable storage medium of claim 1, wherein the updated map provides data for objects at the location in a map tile.

8. The non-transitory machine-readable storage medium of claim 1, wherein the location associated with an area or a unique global coordinate.

9. The non-transitory machine-readable storage medium of claim 1, wherein the respective autonomous vehicles require operator input or oversight to perform navigation.

10. A computing device, comprising:
at least one memory to store crowdsourced sensor data collected from a plurality of vehicles; and
at least one processor configured to:
receive the crowdsourced sensor data collected from respective autonomous vehicles at a location represented in an interoperable map, wherein the respective autonomous vehicles use data from the interoperable map for navigation at the location, and wherein the respective autonomous vehicles use data from a proprietary map for at least one additional service at the location;
compare information observed from the crowdsourced sensor data to information in the interoperable map to identify a change at the location;
update data in at least one of the interoperable map or the proprietary map, based on the change at the location, to establish an updated map to be used by a subsequent autonomous vehicle to perform navigation at the location; and provide the updated map to a map server for distribution to the subsequent autonomous vehicle, to enable the subsequent autonomous vehicle to perform navigation based on the updated map.

11. The computing device of claim 10, wherein the data from the proprietary map is provided in a proprietary format.

12. The computing device of claim 10, wherein the change in the location relates to a new or changed object in the location.

13. The computing device of claim 12, wherein the object is: a road sign or a lane feature.

14. The computing device of claim 10, wherein the at least one processor configured to update data to establish an updated map comprises at last one processor configured to update data to establish an updated map that includes an identification of the location.

15. The computing device of claim 10, wherein the data from the interoperable map is provided in a format based on a universal data structure.

16. The computing device of claim 10, wherein the at least one processor configured to update data to establish an updated map comprises at last one processor configured to update data to establish an updated map that provides data for objects at the location in a map tile.

17. The computing device of claim 10, wherein the location is associated with an area or a unique global coordinate.

18. The computing device of claim 10, wherein the at least one processor is configured to receive the crowdsourced sensor data collected from respective autonomous vehicles that require operator input or oversight to perform navigation.

* * * * *